Patented Feb. 9, 1954

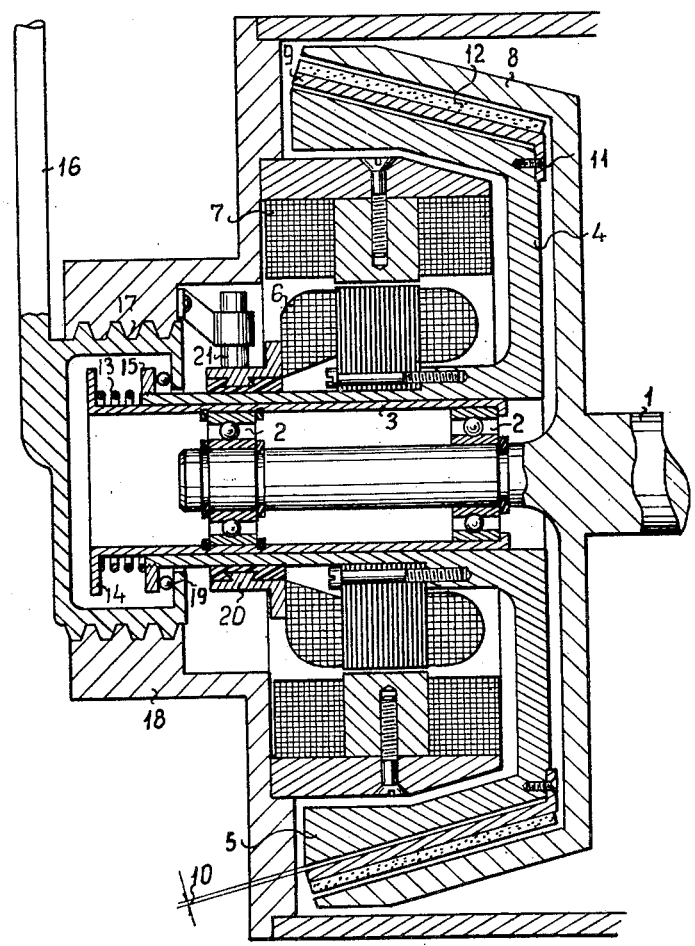

2,668,917

UNITED STATES PATENT OFFICE 2,668,917

ELECTRICALLY DRIVEN FLY-WHEEL STARTER

Edmond Uher, Munich, Germany, assignor to Uher Engineering Company, Panama, Republic of Panama Application September 4, 1952, Serial No. 307,777

Claims priority, application Germany September 5, 1951

8 Claims. (Cl. 290—48)

For starting an internal combustion engine by means of a fly-wheel driven from an electric motor, the main difficulty is to bring said fly-wheel to a sufficient speed since, as known, the kinetic energy stored in a fly-wheel is a function of the square of the rotation speed while it is only directly proportional to the mass.

A first solution consists in separating momentarily the usual fly-wheel of the engine or a portion thereof from the crankshaft to let the electric motor bring it to starting speed and then in re-coupling suddenly the fly-wheel with the crankshaft to start the same.

This implies the interposition of a normally clutched friction coupling between the starting fly-wheel and the crankshaft, and the provision of means for declutching said coupling.

This gives rise to another problem, viz. reducing to a minimum the unavoidable energy absorbing slip of such a friction coupling so that a sufficient amount of power remains available for starting.

My invention relates to a starter of this type in which the speed of rotation of the fly-wheel is increased and in which the above-mentioned objectionable slip is reduced to a minimum.

One object of my invention is to provide a device of the type described in which the friction surfaces of the clutch are at a greater radial distance from the rotational axis than the rotor or stator of the motor.

With this arrangement, the electric motor has a leverage which is comparatively short and, primarily, far shorter than the driving member of the clutch.

In the specification, I have used "the driving member" for designating that member of the clutch which drives the other one (which latter has been called "the driven member") when starting the engine.

Thanks to the shorter leverage of the electric motor, the same is capable of reaching a higher rotation speed and, thus, of storing more kinetic energy.

Moreover, since the friction surfaces of the clutch are farther than the electric motor from the common axis, said friction surfaces can be comparatively important. This considerable friction area, combined with the comparatively long leverage of the driving member of the clutch results in reducing to a minimum the clutch slipping and, therefore, the energy absorbed due to said slipping. As a result, the major portion of the kinetic energy stored in this manner, which is very important due to the high speed of rotation, is available for starting the internal combustion engine.

Now, the use of an electrically driven fly-wheel starter should not increase objectionably the length of the engine.

Another object of my invention is to provide a starter of the type described in which the stator and rotor of the electric motor, and fly-wheel are housed inside the clutch driving member which, for this purpose, is dish-shaped.

A more particular object of my invention is to provide a considerable friction surface by using, as the driving member of the clutch, a flexible and elastic rim slightly spaced radially from its support. Said rim can be, for example, made of sheet metal. Thanks to its flexibility and elasticity, said rim has its whole outer surface bearing in the driven member, under the pressure exerted by the clutching spring.

In a preferred embodiment of my invention, the above-mentioned metal rim is removable, which permits the friction lining of the clutch to be removed, when the same is worn out.

According to another feature of the invention, the considerable friction area obtained, e. g., as indicated above, permits using clutching cones having an angle of conicity smaller than 15°.

In the friction clutches for fly-wheel starters, it has been heretofore impossible to provide such a low conicity since, due to the small friction surfaces of said known clutches, the unitary superficial pressure exerted by the clutching spring is sometimes sufficiently important to cause a jamming in the clutch. A small angle of conicity is, desirable however, for limiting to a minimum the unavoidable slip so as to obtain a "hard" clutching.

Other objects, features and advantages of the invention will become apparent from the following detailed description, together with the accompanying drawing, submitted for purposes of illustration only and not intended to define the scope of the invention, reference being had for that purpose to the subjoined claims.

In this drawing:

I is a shaft, such as, for example, the crankshaft of an internal combustion engine to be started. On shaft I is rotatively mounted, through ball bearings 2, a sleeve 3 on which is mounted for rotational and axial movement a fly-wheel 4. Fly-wheel 4 carries the rotor 6 and has a frustro-conical peripheral portion 5 constituting the driving member of the clutch. Inside said frustro-conical portion 5 of the fly-wheel, which has the shape of a dish-like member, is moreover disposed the stator 7 of the electric motor. The driving member 5 of the clutch is adapted to cooperate with the driven member 8 thereof, which has also the shape of a frusto-conical dish-like member and which is rotatively fast with shaft 1.

As shown in the drawing and according to the essential feature of my invention, rotor 6, stator 7 and fly-wheel 5 are nearer the common axis than the friction surface between the driving and driven members 5 and 8 of the clutch.

As a result, the mechanical leverage of the clutch is comparatively long, the electrical leverage of the motor is comparatively short and the area of the friction surface is comparatively wide.

In the example shown the frustro-conical portion of member 5 merely constitutes the support of the driving member of the clutch, said driving member proper being constituted by a frustro-conical rim or dish-like member 9 slightly spaced radially from its support 5 as shown at 10 and made of, e. g. flexible and deformable sheet metal.

This arrangement has the additional advantage that the driving member of the clutch, when the same is actuated, tightly fits, thanks to its flexibility and elasticity, with the shape of the driven member 8 of the clutch, so that the unitary surface pressure is uniformly distributed. In known cone friction of clutches, it is impossible to obtain a uniform distribution of the pressure of the clutching spring upon the common contact surface.

Rim 9 which carries the lining 12 of the clutch is removably secured by means of screws 11, so that it is extremely simple and cheap, when said lining has been worn out, to replace it by a new one.

The angle of conicity of the two conical members 5—9 and 8 is, in the example shown, about 12° which results in an extremely "hard" clutching—which means that the slips which cannot be completely avoided are however reduced to a minimum. Thanks to the wide surface of friction determined by the radial inner disposition of the rotor, stator and fly-wheel, and in spite of the small angle of conicity, the clutch is no more subject to jamming, notwithstanding the pressure required for clutching.

Electric motor 6—7 is preferably designed as a dynamo-motor unit, so that when the clutching has been completed said unit can be used as a current generator. In particular, it is possible to use the existing dynamo associated with the engine to be started, suitable connecting and switching means being provided to feed said dynamo as an electric motor when the rotor and fly-wheel are de-clutched from the crankshaft.

In the example shown, clutching is ensured under the pressure of a spring 13 interposed between a flange 14 of the sleeve 3 and a collar 15 of the hollow hub of fly-wheel 4.

Declutching is obtained by compressing the spring 13 by means of a lever 16 which is screwed, as indicated at 17, in the coarse pitch threading of a stationary flange 18, said lever acting upon collar 15 on the side opposite to spring 13 through a set of balls 19. 20 is the commutator of rotor, 6 and 21 are the brushes cooperating with said commutator.

What is claimed is:

1. A power unit including an internal combustion engine having a crankshaft and a starter comprising a fly-wheel, a friction clutch having a first member rotatively fast with said crankshaft and a second member rotatively fast with said fly-wheel, an electric motor having a stator and a rotor which is also rotatively fast with said fly-wheel, elastic means for normally clutching said first and second member together to operatively connect said fly-wheel with said engine crankshaft and means for declutching said first and second members from each other against the action of said elastic means to let said rotor store into said fly-wheel the kinetic energy required for starting said engine, said clutch first member being at a greater radial distance from the axis of said crankshaft than said stator, rotor, fly-wheel and clutch second member.

2. A power unit comprising an internal combustion engine having a crank-shaft, a fly-wheel, a friction clutch having a first member rotatively fast with said crank-shaft and a second member rotatively fast with said fly-wheel, a dynamo for starting said engine having a stator and a rotor which is rotatively fast with said fly-wheel, elastic means for normally clutching said first and second members together to operatively connect said fly-wheel with said engine crank-shaft, means to feed said stator and rotor with electric current, so as to transform said dynamo into an electric motor and means for declutching said first and second members from each other against the action of said elastic means to let said rotor store into said fly-wheel the kinetic energy required for starting said engine, said clutch first member being at a greater radial distance from the axis of said crankshaft than said stator, rotor, fly-wheel and clutch second member.

3. For an internal combustion engine having a crankshaft, a starter comprising, in combination, an electric motor having a stator and a rotor, a fly-wheel rotatively fast with said rotor, a friction clutch having a first member adapted to be made rotatively fast with said crankshaft and a second member rotatively fast with said fly-wheel, elastic means for normally clutching said first and second members and means for declutching said first and second members from each other against the action of said elastic means, said clutch first member being at a greater radial distance from the axis of said crankshaft than said stator, rotor, fly-wheel and clutch second member.

4. A starter according to claim 3 in which said clutch second member has the shape of a dish and in which said rotor, stator and fly-wheel are disposed within said clutch second member.

5. A starter according to claim 4 in which said clutch second member is made in two pieces, viz. a hollow support and a frustro-conical rim made of a flexible and elastic material secured on said support with a slight radial spacing and adapted to fit tightly in driving friction contact with said clutch first member.

6. A starter according to claim 5 in which said frustro-conical rim is made of sheet metal.

7. A starter according to claim 5 in which said rim is removably secured on said support.

8. In combination with the crank shaft of an internal combustion engine, a starter mechanism comprising an electric motor including a rotary element freely rotatable about and axially movable with respect to said shaft and a stationary element surrounding said rotary element, a member connected to said rotary element and extending radially therefrom, a friction clutch including a male cone carried by said radially extending member so as to surround said stationary element and a female cone frictionally engageable by said male cone and mounted to rotate with said shaft, said radially extending member forming with said male cone a fly-wheel, and means for imparting an axial movement to said rotary element, the arrangement being such that said elements of the electric motor and the frictional contact surfaces of said cone lie in substantially the same radial zone with said frictional contact surfaces at a greater distance from the common rotational axis than said elements.

EDMOND UHER.

References Cited in the file of this patent

UNITED STATES PATENTS

| Number | Name | Date |
|---|---|---|
| 1,159,752 | Fisher | Nov. 9, 1915 |
| 1,207,821 | Wadsworth | Dec. 12, 1916 |
| 1,217,244 | Turbayne | Feb. 27, 1917 |